United States Patent
List et al.

(10) Patent No.: US 11,454,990 B1
(45) Date of Patent: Sep. 27, 2022

(54) SYSTEMS AND METHODS FOR SCALING LAG BASED ON FLIGHT PHASE OF AN ELECTRIC AIRCRAFT

(71) Applicant: BETA AIR, LLC, South Burlington, VT (US)

(72) Inventors: Alexander Hoekje List, South Burlington, VT (US); Vincent Moeykens, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/562,090

(22) Filed: Dec. 27, 2021

(51) Int. Cl.
  *G05D 1/10* (2006.01)
  *B64C 29/00* (2006.01)
  *B64D 27/24* (2006.01)

(52) U.S. Cl.
  CPC ............. *G05D 1/102* (2013.01); *B64C 29/00* (2013.01); *B64D 27/24* (2013.01)

(58) Field of Classification Search
  CPC ......... G05D 1/102; B64C 29/00; B64D 27/24
  See application file for complete search history.

(56) References Cited

U.S. PATENT DOCUMENTS

| | | | | |
|---|---|---|---|---|
| 8,639,401 B2* | 1/2014 | Bailey | ................... | G08G 5/0052 701/2 |
| 8,665,121 B2* | 3/2014 | Shavit | ................... | G08G 5/0043 340/963 |
| 9,313,276 B2* | 4/2016 | Pereira | ................ | H04B 7/18506 |
| 9,576,404 B2* | 2/2017 | Ziarno | ................ | H04B 7/18506 |
| 9,613,536 B1* | 4/2017 | Wolford | ............... | G08G 5/0026 |
| 11,087,629 B2* | 8/2021 | Urbanek | ............ | H04B 7/18506 |
| 2003/0225492 A1* | 12/2003 | Cope | ........................ | G07C 5/008 701/14 |
| 2010/0318336 A1* | 12/2010 | Falangas | ................. | G06F 30/15 703/8 |
| 2013/0323688 A1* | 12/2013 | Whitlow | ................ | G08B 21/06 434/35 |
| 2016/0236790 A1* | 8/2016 | Knapp | .................. | G08G 5/0021 |
| 2017/0176575 A1* | 6/2017 | Smits | ..................... | G01S 7/4808 |
| 2018/0297210 A1* | 10/2018 | Peterson | .............. | G05D 1/0022 |
| 2019/0054937 A1* | 2/2019 | Graetz | ................. | G05D 1/0094 |
| 2019/0090800 A1* | 3/2019 | Bosworth | ............ | A61B 5/0015 |

(Continued)

FOREIGN PATENT DOCUMENTS

WO     WO-02099769 A1 * 12/2002    ........... G08G 5/0043

*Primary Examiner* — Behrang Badii
*Assistant Examiner* — Jalal C Coduroglu
(74) *Attorney, Agent, or Firm* — Caldwell Intellectual Property Law

(57) ABSTRACT

A system for scaling lag based on flight phase of an electric aircraft is presented. The system include a sensor connected to an electric aircraft configured to detect measured aircraft data, identify a flight phase of the electric aircraft, and generate a flight datum. The system further comprises a computing device communicatively connected to the sensor, wherein the computing device is configured to receive the flight datum and the flight phase, identify an input latency as a function of the flight datum, select a lag frame as a function of the input latency, wherein the lag frame further comprises a lag threshold, and transmit the flight datum to a user device as a function of the lag frame. The system further includes a remotely located user device configured to receive the flight datum.

20 Claims, 8 Drawing Sheets

(56) References Cited

U.S. PATENT DOCUMENTS

2019/0246351 A1\* 8/2019 Yang ................. H04W 52/0229
2021/0058331 A1  2/2021 Downey et al.
2021/0089055 A1\* 3/2021 Tran .................... G08G 5/0078
2021/0089134 A1\* 3/2021 Tran .................... G08G 5/0021
2021/0354729 A1\* 11/2021 Ng .................... B60W 60/0018

\* cited by examiner

SYSTEMS AND METHODS FOR SCALING LAG BASED ON FLIGHT PHASE OF AN ELECTRIC AIRCRAFT

FIELD OF THE INVENTION

The present invention generally relates to the field of scaling lag. In particular, the present invention is directed to systems and methods for scaling lag based on flight phase of an electric aircraft.

BACKGROUND

Electric aircrafts may open a new mode of transportation that connects people and locations that previous modes of transportations may have limited. The complete flight of an aircraft requires the aircraft to perform a complex variety of maneuvers and flight phases compared to ground transportation vehicles. Electric aircrafts may require operating complex and intensive systems. Furthermore, maintaining a consistent stream of communication and transfer of data may result in varying latency based on the complexity and intensity required in operating the electric aircraft. This may result in inconsistent data transfer between the electric aircraft and a remote device, and strain on the bandwidth the connection. The consistent and uninterrupted transfer of data from an electric aircraft may be limited to the latency or bandwidth of any wireless or network connections involving the electric aircraft.

SUMMARY OF THE DISCLOSURE

In an aspect, a system for scaling lag based on flight phase of an electric aircraft is presented. The system include a sensor communicatively connected to an electric aircraft, wherein the sensor is configured to detect measured aircraft data, identify a flight phase of the electric aircraft, and generate a flight datum as a function of the measured aircraft data and the flight phase. The system further comprises a computing device communicatively connected to the sensor, wherein the computing device is configured to receive the flight datum and the flight phase, identify an input latency as a function of the flight datum, select a lag frame as a function of the input latency, wherein the lag frame further comprises a lag threshold, and transmit the flight datum to a user device as a function of the lag frame. The system further includes a user device configured to receive the flight datum.

In another aspect, a method for scaling lag based on flight phase of an electric aircraft is presented. The method includes detecting, by a sensor communicatively connected to an electric aircraft, measured aircraft data, identifying a flight phase of the electric aircraft, generating a flight datum as a function of the measured aircraft data and the flight phase, receiving, by a computing device communicatively connected to the sensor, the flight datum and the flight phase, identifying an input latency as a function of the flight datum, selecting a lag frame as a function of the input latency, wherein the lag frame further comprises a lag threshold, transmitting the flight datum to a user device as a function of the lag frame, and receiving, by the user device, the flight datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
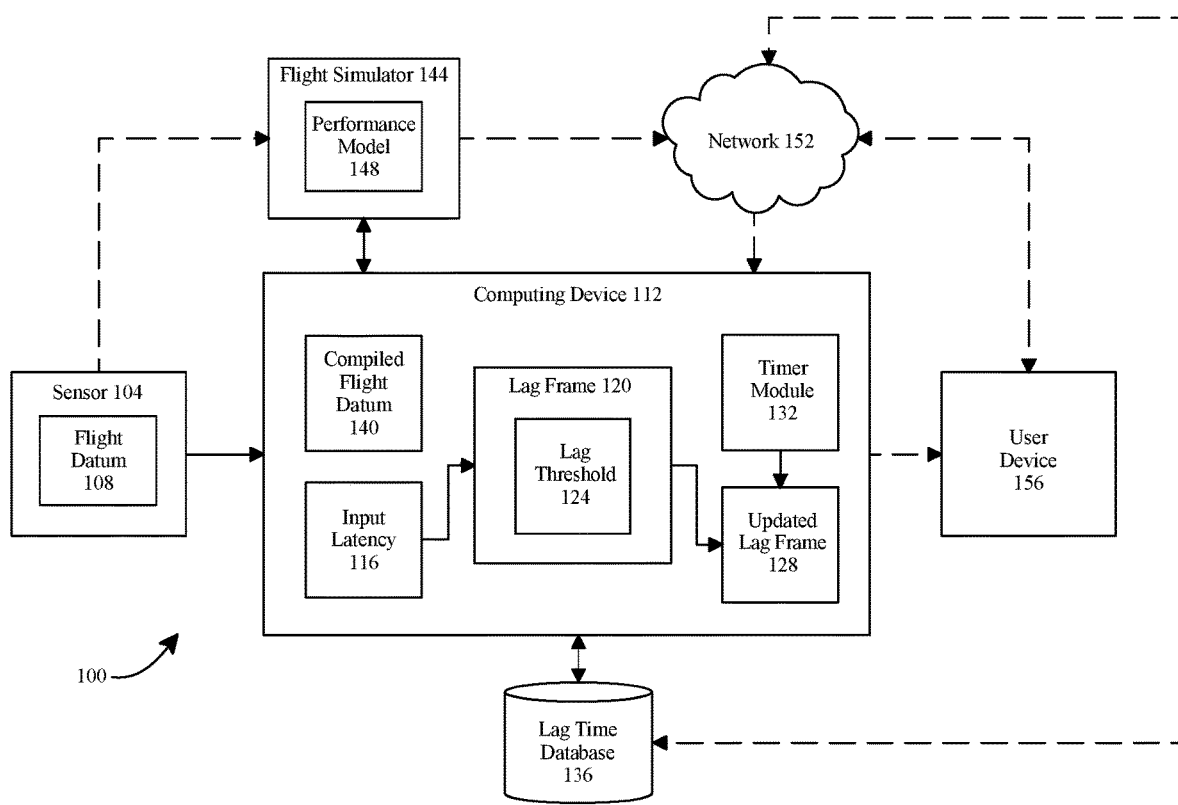
FIG. 1 is a block diagram of an exemplary embodiment of a system for scalable lag based on flight phase of an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for scalable lag based on flight phase of an electric aircraft. In an embodiment, the electric aircraft may include an electric vertical take-off and landing (eVTOL) aircraft. The electric aircraft may collect and analyze data to be sent to a remotely operated device. The connection between the device and the electric aircraft may include a specific bandwidth. The electric aircraft may want to capture as much data as it can and throughout its operation or flight. In an embodiment, the electric aircraft may experience various flight phases such as lift off, climb, cruise, descent, landing etc., wherein each phase may require various intensity of electrical systems within the electric aircraft. Within the completion of a flight phase, the intensity of the electrical systems may interfere with sensors attempting to capture and measure data, wherein a continuous process of capturing data, generating data, or transferring data, may result in straining the bandwidth of the connecting between the electric aircraft and the remotely operated device. Furthermore, the intensity may result in high latency and delayed reception of data by the remotely operated device. Aspects of the present disclosure may delay the transmission of data by transmitting chunks of data measured at specific time intervals to reduce strain on the bandwidth and/or reduce latency during flight phases that require intensive operations of electrical systems, such as during the climb or descent stage of the electric aircraft. Aspects of the present disclosure may also delay transmission at specific intervals based on different flight phases as certain flight phases may require more constant communication between the electric aircraft and another party, using up more of the bandwidth of the connection.

Aspects of the present disclosure can be used to transmit data in a consistent manner despite a delay. Aspects of the present disclosure can also be used to detect when the electric aircraft experiences various flight phases and delay transmission based on the current flight phase the electric aircraft is experiencing. In an embodiment, each flight phase may be associated with a different time delay of data transmission as each flight phase may result in different remaining bandwidth to be used for data transmission. This is so, at least in part, to allow for the most efficient data transfer that may be allowed for the current flight phase the electric aircraft is currently experiencing. In an embodiment, the time delay for data transfer to a remote user device during a lift off of the electric aircraft may be a 1 second delay for the remote user device to receive and display the data, wherein the lift off requires less intensive operation of electric aircraft systems and less use of the bandwidth of the connection. In another embodiment, the time delay for data transfer during an angled upward climb of the electric aircraft may be a 30 second delay, wherein this phase may require more constant communication between the pilot and a ground personnel which may use more of the bandwidth of the connection between the electric aircraft and a remote user device.

Aspects of the present disclosure can be used to generate a standardized collection of data based on the chunks of data that may be measured for transfer as a result of the time delay. This is so, at least in part, to provide a generalized collection of information describing the data measured by the electric aircraft during a flight phase. In an embodiment the generalized data may include simulated model that visualizes the electric aircraft and its performance during a flight phase. In another embodiment, the generalized data may include an average of quantifiable data of the chunks of data measured as a result of the time delay.

Aspects of the present disclosure can also allow for the time delay to be adjusted accordingly. In an embodiment, certain flight phases may require various levels of intensity of electrical systems or bandwidth, in which machine-learning models may be used to generate new or updated time delays that may best suit or predict the time delay for following instances of that same flight phase. Aspects of the present disclosure can allow for specific assigned time delays to be stored in a database. This is so, at least in part, to easily select a time delay for a specific flight phase that best suits the bandwidth or latency constraints involving that flight phase. This is also, at least in part, to create a more robust database that may better and accurately generate new or updated time delays for flight phases. Aspects of the present disclosure may also initiate a time delay for data transfer in the event a connection with the remote device is lost. The connection may involve a network, wireless, Bluetooth, etc.

Referring now to FIG. 1, a block diagram of an exemplary embodiment of a system 100 for scalable lag based on flight phase of an electric aircraft is illustrated. The electric aircraft may include, but not limited to, an electric vertical take-off and landing (eVTOL) aircraft, an unmanned aerial vehicle (UAV), a drone, etc. System 100 includes computing device 112. computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 112 may include a single computing device operating independently, or may include two or more computing device operating in concert, in parallel, sequentially or the like; two or more computing devices may be included together in a single computing device or in two or more computing devices. computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 112 may include but is not limited to, for example, a computing device or cluster of computing devices in a first location and a second computing device or cluster of computing devices in a second location. computing device 112 may include one or more computing devices dedicated to data storage, security, distribution of traffic for load balancing, and the like. computing device 112 may distribute one or more computing tasks as described below across a plurality of computing devices of computing device, which may operate in parallel, in series, redundantly, or in any other manner used for distribution of tasks or memory between computing devices. computing device 112 may be implemented using a "shared nothing" architecture in which data is cached at the worker, in an embodiment, this may enable scalability of system 100 and/or computing device.

With continued reference to FIG. 1, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 may include a sensor 104. A "sensor," for the purposes of this disclosure, is an electronic device configured to detect, capture, measure, or combination thereof, a plurality of external and electric aircraft component quantities. Sensor 104 may include any computing device as described in the entirety of this disclosure and configured to convert and/or translate a plurality of signals detected into electrical signals for further analysis and/or manipulation. In a non-limiting embodiment, sensor 104 may include a plurality of sensors comprised in a sensor suite. For example and without limitation, sensor 104 may include flow sensors, temperature sensors, altimeters, pressure sensors, proximity sensors, airspeed indicators, position sensors, global positioning system (GPS), humidity sensors, level sensors, gas sensors, wireless sensor networks (WSN), compasses, magnetometers, altitude heading and reference systems (AHRSes), tachometers, etc. In a non-limiting embodiment, sensor 104 may be communicatively connected to the electric aircraft of system 100. As used in this disclosure, "communicatively connected" is defined as a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. Persons skilled in the art, upon reviewing the entirety of this disclosure, will be aware of the various embodiments of controlling a cursor for visual data manipulation for purposes as described herein. Persons skilled in the art, upon reviewing the entirety of this disclosure, will also be aware of the various warning symbols that may be employed to grab the attention of a pilot in the context of simulation consistently described in the entirety of this disclosure.

With continued reference to FIG. 1, sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, and the like. In a non-limiting embodiment, sensor 104 may use of active range finding methods which may include, but not limited to, light detection and ranging (LIDAR), radar, sonar, ultrasonic range finding, forward-looking infrared (FLIR) cameras, enhanced vision systems (EVS), short wave infrared (SWIR) imagers, or the like thereof.

Still referring to FIG. 1, sensor 104 may be installed onto a plurality of flight instruments of the electric aircraft. As used in this disclosure, a "flight instrument," is defined as an instrument used to provide information involving the flight situation of an electric aircraft it is installed on. In some embodiments, the information of the flight situation may include, but not limited to, altitude, attitude, airspeed, vertical speed, heading, and the like thereof. Sensor 104 installed onto the flight instruments may include an accelerometer, a gyroscope, a torque monitor, tachometers, engine temperature gauges, fuel- and oil-quantity gauges, pressure gauges, altimeters, airspeed-measurement meters, vertical speed indicators and/or combination thereof. In another embodiment, sensor 104 may include radars such as, doppler radars, lightning-detection radars, terrain radars, anti-collision warning systems, stall warning systems, etc. In a non-limiting embodiment, various types of sensor 104 may be used to inform the pilot of the electric aircraft or a user interacting with a remote device in communication with the electric aircraft to take proper action and precaution, and prevent any kind of disaster or accident. Any information captured by sensor 104 may be used for ground testing, flight testing, vibration, environment, angle of attack, static, and the like thereof. Sensor 104 may include a sensor suite which may include a plurality of sensors, wherein the sensors may include any sensor described herein.

Still referring to FIG. 1 may be integrated and/or communicatively connected to at least an actuator and/or flight component, a portion thereof, or any subcomponent thereof of the electric aircraft. An "actuator," for the purpose of this disclosure, is a device configured to produce motion. A "flight component," for the purpose of this disclosure, is a device that produces motion and/or power for an electric aircraft. In a non-limiting embodiment, the actuator may be consistent with any flight component as described herein. For example and without limitation, sensor 104 may be disposed onto a plurality of actuators and/or flight components such as, vertical propulsors, forward pushers, motors, electric motors, electric energy source, ailerons, rudders, wings, wing tips, tail, etc. In a non-limiting embodiment, flight components and/or actuators may be any part of an electric aircraft that helps it to achieve physical movements by converting energy, often electrical, air, or hydraulic, into mechanical force and enable movement. "Disposed," for the purpose of this disclosure, is the physical placement of an electrical device on a part of an electric aircraft. Persons skilled in the art, upon reviewing the entirety of this disclosure, will be aware of the various placements of a variety of sensors onto a variety of flight components for capturing data related to the functions of the individual flight components.

With continued reference to FIG. 1, sensor 104 may be configured to detect measured aircraft data. A "measured aircraft data," for the purpose of this disclosure, are signals representing information captured by sensor 104 or any sensor as described in the entirety of this disclosure. In a non-limiting embodiment, the measured aircraft data may include temperature, voltage, wind resistance, pressure, speed, angles, acceleration, flight speed, flight angle, lag, thrust, lift, and the like thereof. Sensor 104 may also detect a plurality of maneuver data. A "plurality of maneuver data," for the purpose of this disclosure, is any collection of information describing completion by the pilot of procedures and concepts that control the electric aircraft, a simulated electric aircraft, and/or the simulator module. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along A road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure.

With continued reference to FIG. 1, sensor 104 may be configured detect measured state data. A "measured state data," as used in this disclosure, is a datum that is collected via a physical controller area network (CAN) bus unit describing a plurality of functionalities of the electric aircraft. A "physical controller area network bus," as used in this disclosure, is vehicle bus unit including a central processing unit (CPU), a CAN controller, and a transceiver designed to allow devices to communicate with each other's applications without the need of a host computer which is located physically at the electric aircraft. In a non-limiting embodiment, the electric aircraft may include a plurality of physical CAN bus units communicatively connected to the electric aircraft. For instance and without limitation, the physical CAN bus unit may be consistent with the physical CAN bus unit in U.S. patent application Ser. No. 17/218,312 and entitled, "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated by reference herein in its entirety. In a non-limiting embodiment, the measured state data may include a plurality of data signals detailing a control to one or more actuators communicatively connected to the aircraft. Measured state data may include a plurality of data entries relating aircraft pitch, roll, yaw, torque, angular velocity, climb, speed, performance, lift, thrust, drag, battery charge, fuel level, location, and the like. Measured state data may include a plurality of data communicating the status of flight control devices such as proportional-integral-derivative controller, fly-by-wire system functionality, aircraft brakes, impeller, artificial feel devices, stick shaker, power-by-wire systems, active flow control, thrust vectoring, alerion, landing gear, battery pack, propulsor, management components, control surfaces, sensors/sensor suites, creature comforts, inceptor, throttle, collective, cyclic, yaw pedals, MFDs, PFDs, and the like. Measured state data may exist as analogue and/or digital data, originating from physical CAN bus units such as bits, where a series of serial binary data are composed and transmitted relaying a measured state as indicated from a device located within, on, or communicating with the electric aircraft.

Still referring to FIG. 1, sensor 104 may be configured to identify a flight phase of the electric aircraft. As described in this disclosure, a "flight phase" is defined as a stage or period within a flight. In a non-limiting embodiment, the electric aircraft may undergo a plurality of different flight phases in the course of a completion of a flight. For example and without limitation, the flight phases may include a planning phase, lift-off/take-off phase, climb phase, cruise phase, descent phase, approach phase, taxi phase, hover phase, landing phase, and the like thereof. In an embodiment, sensor 104 may identify the flight phase of the electric aircraft as a function of the measured aircraft data, such as the plurality of maneuver data. In a non-limiting embodiment, the pilot of the electric aircraft may perform various flight maneuvers that result in the electric aircraft exerting power on various systems and flight components which is detected by sensor 104 and identify the flight phase the electric aircraft is currently in or performing. The pilot may perform the flight maneuvers using one or more pilot controls of the electric aircraft. Aa "pilot control," for the purpose of this disclosure, is an interactive mechanism or means which allows a pilot to control operation of flight components of an electric aircraft. In a non-limiting embodiment, the pilot control may be used by a pilot to manipulate and/or command the components of an electric aircraft. In a non-limiting embodiment, the pilot control may be communicatively connected to sensor 104 and receive a pilot input. A "pilot input" for the purpose of this disclosure, is as any gauge, throttle lever, clutch, dial, control, or any other mechanical or electrical device that is configured to be manipulated by a pilot to receive information. In a non-limiting embodiment, the pilot control may be physically located in the cockpit of the aircraft or remotely located outside of the aircraft in another location communicatively connected to at least a portion of the aircraft. The pilot control may include buttons, switches, or other binary inputs in addition to, or alternatively than digital controls about which a plurality of inputs may be received. In a non-limiting embodiment, the pilot input may include a physical manipulation of a control like a pilot using a hand and arm to push or pull a lever, or a pilot using a finger to manipulate a switch. In another non-limiting embodiment, the pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to sensor 104. In some cases, simulator module 120, the physical cockpit, and the pilot control may include sensor 104 and/or be communicatively connected to sensor 104. In a non-limiting embodiment, sensor 104 may be communicatively connected to computing device 112. In some cases, sensor 104 may be configured to detect a user interaction with pilot control. Persons skilled in the art, upon reviewing the entirety of this disclosure, will be aware of the various embodiments and functions of the at least a pilot control for purposes as described herein.

Still referring to FIG. 1, sensor 104 may be configured to generate a flight datum 108. As used in this disclosure, a "flight datum" is defined as an element of readable information of the measured aircraft data and/or any data involving or describing the electric aircraft and its functions. In a non-limiting embodiment, flight datum 108 may be generated as a function of the measured aircraft data and the flight phase of the electric aircraft. For example and without limitation, sensor 104 may detect and/or receive a plurality of signals representing data captured by sensor 104 and translate those signals into computer-readable data. The translated data my include a collection of data to be viewed, analyzed, and/or manipulated by a computing device 112 and/or a user/pilot. In a non-limiting embodiment, any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. For example and without limitation, A plurality of datum captured by sensor 104 may include circuitry, computing devices, electronic components or a combination thereof that translates into at least an electronic signal configured to be transmitted to another electronic component. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, sensor 104 may be configured to identify and/or connect to a network 152. A "network," as described in this disclosure, a system of interconnected computer networks that uses Internet protocol suite (TCP/IP) to communicate between networks and computing devices. In a non-limiting embodiment, the network may be the Internet. In another non-limiting embodiment, the network may include a computer network or a plurality of computer networks. A "computer network," for the purpose of this disclosure, a set of computing devices sharing resources located on or provided by network nodes. The computing devices use common communication protocols over digital interconnections to communicate with each other. In some embodiments, network 152 may include any mesh network such as an avionic mesh network. For instance and without limitation, the avionic mesh network may be consistent with the avionic mesh network in U.S. patent application Ser. No. 17/348,916 and entitled, "METHODS AND SYSTEMS FOR SIMULATED OPERATION OF AN ELECTRIC VERTICAL TAKE-OFF AND LANDING (EVTOL) AIRCRAFT," which is incorporated by reference herein in its entirety. In another non-limiting embodiment, network 152 may include an inter-aircraft network and/or intra-aircraft network, wherein the inter-aircraft network and/or intra-aircraft network are consistent with the inter-aircraft network and/or intra-aircraft network in U.S. patent application Ser. No. 17/348,916 and entitled, "METHODS AND SYSTEMS FOR SIMULATED OPERATION OF AN ELECTRIC VERTICAL TAKE-OFF AND LANDING (EVTOL) AIRCRAFT," which is incorporated by reference herein in its entirety. In a non-limiting embodiment, network 152 may be configured to facilitate communicative connection and/or communication between devices. For example and without limitation, sensor 104 and/or computing device 112 may transmit/receive signals with other computing devices such as user device 156 and/or other flying electric aircrafts as a function of the physical CAN bus units and/or network 152. Persons skilled in the art, upon reviewing the entirety of this disclosure, will be aware of the various embodiments of network communication between multiple devices for purposes as described herein.

With continued reference to FIG. 1, sensor 104 may transmit flight datum 108 to computing device 112. In a non-limiting embodiment, computing device 112 may be configured to receive flight datum 108 from sensor 104, wherein sensor 104 is communicatively connected to computing device 112. In a non-limiting embodiment, computing device 112 may include a flight controller. In a non-limiting embodiment, computing device 112 may be communicatively connected to a plurality of physical CAN bus units configured to transmit and/or receive signals between other computing devices such as user device 156 and/or other electric aircrafts nearby. For example and without limitation, the electric aircraft may include computing device 112 wherein the electric aircraft and computing device 112 communicate, in tandem, with other devices. Computing device 112 may be communicatively connected to the electric aircraft, wherein the computing device within the electric aircraft may perform any data analysis and/or manipulation on the electric aircraft's side. This is so, at least in part for the electric aircraft to analyze, manipulate, and view any datum captured by its sensors disposed on the electric aircraft by a pilot inside the flying electric aircraft. In a non-limiting embodiment, the electric aircraft may easily generate flight datum 108 as a function of sensor 104 and/or computing device 112 attached to the electric aircraft before transferring flight datum 108 to user device 156 that may be remotely located somewhere on the ground. Alternatively or additionally, computing device 112 may be attached to user device 156, wherein the remotely located user device 156 may control any datum the electric aircraft may capture on the user device's side. This is so, at least in part, for data to be analyzed and/or manipulated away from the electric aircraft in the event the electric aircraft experiences a malfunction or is damaged, lost, destroyed, etc., in which the data that may have been stored within the electric aircraft is lost. In a non-limiting embodiment, computing device 112 may communicate with other computing devices via network 152 that facilitates such communication. In a non-limiting embodiment, computing device 112 may receive flight datum 108 as a function of the plurality of physical CAN bus units connected to sensor 104 and/or computing device 112. Computing device 112 may be configured to transmit flight datum 108 to other devices such as user device via network 152 and/or the plurality of physical can BUS units. In a non-limiting embodiment, computing device 112 may be configured to communicate with user device 156 only in the event that they are connected to each other within network 152. For example and without limitation, network 152 may establish a connection between the electric aircraft and user device 156. In a non-limiting embodiment, computing device 112 of the electric aircraft may be configured to transmit flight datum 108 generated by sensor 104 based on the measured aircraft data to user device 156. A "user device," for the purpose of this disclosure, is any additional computing device, such as a mobile device, laptop, desktop computer, or the like. In a non-limiting embodiment, user device 156 may be a computer and/or smart phone operated by a user in a remote location. User device 156 may include, without limitation, a display in communication with computing device 104; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device 156 may include a graphical user interface configured to display any information from computing device 112 and/or any computing device. In a non-limiting embodiment, user device 156 may be utilized by a user located remotely from the electric aircraft in order to analyze data from the electric aircraft in a remote location. Persons skilled in the art, upon reviewing the entirety of this disclosure, will be aware of a separate computing device used for receiving and analyzing data from a flying electric aircraft for purposes as described herein.

With continued reference to FIG. 1, the connection established by electric aircraft and user device 156 may be limited by the bandwidth of network 156 that both devices are connected by. A "bandwidth," as used in this disclosure, is the maximum rate of data transfer a cross a connection. Alternatively or additionally, the bandwidth may include an airband or aircraft band. An "airband," as used in this disclosure, is a group of frequencies in the very high frequency (VHF) radio spectrum allocated to radio communication. For example and without limitation, the pilot of the electric aircraft and user of user device 156 may exchange information as a function of radio communications limited by the communication's airband.

With continued reference to FIG. 1, computing device 112 may be configured to identify an input latency 116. An "input latency," as used in this disclosure, is the amount of time that passes between sending an electrical signal and to another device for the occurrence of a certain action. In a non-limiting embodiment, the bandwidth of the communication for the transfer of data between the electric aircraft may be 5 kHz. Computing device 112 may identify input latency 116 based on the frame rate of user device 156. Computing device 112 may measure input latency 116 of user device 156 using a packet sniffer and/or any third party software (e.g. Wireshark). For example and without limitation, user device 156 may use any packet sniffer to measure and identify input latency 116 of user device 156 and inform computing device 112 of the electric aircraft. In another example, computing device 112 may use any packet sniffer to measure and identify input latency 116 of user device 156. In a non-limiting embodiment, the frame rate of a monitor on user device 156 may be 60 frames per second (FPS), in which the minimum theoretical input latency of user device 156 may be 16.67 milliseconds. In a non-limiting embodiment, input latency 116 may be subject to change as a function of varying software applications being run on user device 156 and/or computing device 112 of the electric aircraft.

Still referring to FIG. 1, computing device 112 of the electric aircraft may be configured to select a lag frame 120. A "lag frame," for the purpose of this disclosure, is a time delay for transmitting data to another device. In a non-limiting embodiment, computing device 112 may select lag frame 120 as a function of input latency 116 and/or the bandwidth. For example and without limitation, computing device 112 on the electric aircraft may transmit flight datum 108 as a function of lag frame 120. Lag frame 120 may include a time delay in transmission such as, but not limited to, 1 second delay, 30 second delay, 300 millisecond delay, and the like thereof. This is so, at least in part, so that the data being transferred is not pending for an extended period of time within the line(s) of communication of network 152 in the event communication is lost and/or an interference. In another example, data may be in queue along with other data wherein the bandwidth may not be able to support instantaneous transmission of all the data being transferred, posing a risk of loss of data and/or the stealing of data by a third party. In another example, the pending wait time in queue for data transfer may be inconsistent which may result in inconsistent data transfer which may be inconvenient. Lag frame 120 may be a time interval in which data is to be transmitted, wherein the data is compressed into chunks to be sent per time interval. This is so, at least in part, because flight datum 108 may include continuously generated datum as a function of new data being captured during the electric aircraft's flight, in which the new data being capture and measured is to be transmitted to user device 156 in groups or chunks in a consistent manner such as the time intervals of lag frame 120. Persons skilled in the art, upon reviewing the entirety of this disclosure, will be aware of the various risks of lagging data transfer for purposes as described herein.

Still referring to FIG. 1, sensor 104 may be configured to generate flight datum 108 as a function of lag frame 120. For example and without limitation, lag frame 120 may include time intervals of 30 seconds indicating when computing device 112 is to transmit flight datum 108 to user device 156. In addition to transmitting chunks flight datum 108 generated throughout the flight of the electric aircraft to user device 156, computing device 112 may compile such chunks of flight datum 108 for each flight phase into a compiled flight datum 140. A "compiled flight datum," as used in this disclosure, is a standardized flight datum generated during a flight phase. In a non-limiting embodiment, each flight phase may include its own compiled flight datum 140. In another non-limiting embodiment, compiled flight datum 140 may include averages of quantifiable data of flight datum 108 and/or chunks of flight datum 108. This is so, at least in part, for computing device 112 to generate a readable collection of information that best compensates for any data that may be incomprehensible as a result of delayed data transmission. This is also, at least in part, to transmit the flight datum in a more comprehensible form and/or transmit the flight datum in minimal chunks in order to bypass the limitations imposed by lag frame 120 and/or the bandwidth. Computing device 112 may transmit compiled flight datum 140 to user device 156. Persons skilled in the art, upon reviewing the entirety of this disclosure, will be aware of the various embodiments of generating a collection of information to be sent out in reduced forms for purposes as described herein.

With continued reference to FIG. 1, computing device 112 may operate a flight simulator 144 to generate a virtual representation of flight datum 108. In a non-limiting embodiment, flight simulator may generate a virtual representation of compiled flight datum 140. A "flight simulator," for the purpose of this disclosure, is a program or set of operations that simulate a model of the electric aircraft and its functions. A "virtual representation," for the purpose of this disclosure, is any model or simulation which is representative of a physical phenomenon such as the flying of the electric aircraft. For instance and without limitation, flight simulator 144 may be consistent with the flight simulator in U.S. patent application Ser. No. 17/348,916, which is incorporated by reference herein in its entirety. Additionally, the virtual representation may be consistent with the virtual representation in U.S. patent application Ser. No. 17/348,916, which is incorporated by reference in its entirety. In a non-limiting embodiment, flight simulator 144 may simulate a virtual representation of flight datum 108 and/or compiled flight datum 140 of the electric aircraft. The virtual representation may include a performance model 148. A "performance model," for the purpose of this disclosure, is a simulated model depicting the electric aircraft and/or any flight datum. In a non-limiting embodiment, performance model 148 may be representative of performance model 148. This is so, at least in part, to provide a visual representation of data collected by the electric aircraft that is easily understood and analyzed by a user utilizing user device 156. Computing device 112 may be configured to transmit performance model 148 to user device 156 as a part of the flight datum.

With continued reference to FIG. 1, computing device may select lag frame based on the flight phase of the electric aircraft. For example and without limitation, certain flight phases may undergo varying intensity of various electrical systems and software of the electric aircraft such as telemetric equipment. This may include various communication and/or transfer of secondary data related to safely maneuvering the electric aircraft during the flight phase or any data not relevant or part of flight datum 108. In this situation, the transfer of secondary data may be of greater importance between the electric aircraft and user device 156, in which the transfer of flight datum 108 may be stalled to avoid straining the bandwidth of the communication links. Different flight phases may result in different lag frame 120. For example and without limitation, during the flight phase of lift-off, computing device 112 may select lag frame of 1 second as the lift-off phase may requires less transfer of secondary data and more room for the transfer of flight datum 108 to user device 156. In another example, in the flight phase of cruising, consistent communication for purposes related to air traffic control, guidance, navigation, etc., may take priority over the transfer of flight datum 108, in which the selected lag frame 108 in this phase is 30 seconds. In a non-limiting embodiment, lag frame 120 that is smaller may allow computing device 112 to transfer flight datum 108 at high speeds such as 100 kbits/s where has lag frame 120 that is larger may limit computing device 112 to transfer flight datum at low speeds such as 12.5 k bit/s.

Still referring to FIG. 1, lag frame 120 may be subject to change based on the duration of the flight phase. In a non-limiting embodiment, computing device 112 may select lag frame 120 and correspond that lag frame to the flight phase. In a non-limiting embodiment, lag frame 120 is a constant time delay whereas the duration of a flight phase is variable. For example and without limitation, based on a flight plan of the electric aircraft, the lift-off phase, climb phase, cruise phase, descent phase, etc., may be different to similar phases for a different flight plan. The electric aircraft may be subject to fly at a faster velocity in a cruise phase compared to a different flight wherein the electric aircraft is subject to fly at a slower velocity in the same phase. In another example, the electric aircraft may be required to fly at a higher climb angle and rate for certain flights. Each variable flight phase may result in variable data transfer which results in variable lag frames despite a constant bandwidth. In a non-limiting embodiment, as computing device 112 deduces that a certain flight phase, such as the climb phase, is assigned a lag frame of 1 second, the electric aircraft may experience intensive flight maneuvers during climb in which the electric aircraft is transferring secondary data at a higher speed, resulting in less speed available for the transmitting of flight datum 108 to avoid exceeding the bandwidth limits. In similar embodiments, computing device 112 may be configured to update lag frame 120 as a function of a lag threshold 124. In a non-limiting embodiment, the flight phase of take-off and/or landing may include more frequent communication, in which resulting in lesser lag frames to allow for the frequent communication. In some embodiments, this may also result in a larger lag frame of data transmission to compensate for reducing lag for the frequent communication with respect to the bandwidth In another embodiment, the cruise phase may include infrequent communication as a result of smoother flight in which guidance via communication is less required. In this phase, the lag frame may be larger to leave plenty room in the bandwidth for other transmissions. A "lag threshold," as used in this disclosure, is a time value that triggers an action in the event the time value is reached. In a non-limiting embodiment, lag threshold 124 may include a standard deviation that may be used as wiggle room for lag frame 120 in the event the flight phase may result in extra use of the bandwidth. Lag threshold 124 may include upper and lower values configured to trigger a response, such as updating lag frame 120, generating updated lag frame 128, or replacing lag frame 120. In a non-limiting embodiment, lag threshold 124 may include percentages. For example and without limitation, in a climb phase, the assigned lag frame 120 may include a time delay of 1 second for transmitting flight datum 108. However, this climb phase may experience various intensity with its systems and require more room for data transfer of secondary data. To compensate for variable electric aircraft operations and flight phases, lag threshold 124 may be used to maintain consistent time delays of lag frame 120. For example and without limitation, if a lag frame of 1 second specifically selected for the climb phase is too strenuous on the bandwidth of the communication, computing device 112 may update lag frame 120 and/or generate a new lag frame such as updated lag frame 128. An "updated lag frame," as used in this disclosure, is a new lag frame that better suits the bandwidth for a flight phase compared to a previous lag frame. In a non-limiting embodiment, updated lag frame 128 may be a lag frame with an increased or decrease time delay based on the intensity of the flight phase. For example and without limitation, if the climb phase is less intensive than average, wherein the bandwidth has room for a shorter lag frame than the original lag frame 120 with a time delay of 1 second, selected and assigned to the climb phase, computing device 112 may generate updated lag frame 128 that includes a time delay of 0.8 seconds. Persons skilled in the art, upon reviewing the entirety of this disclosure, will be aware of the various embodiments of adjusting the lag frame to better use the bandwidth for purposes as described herein. In a non-limiting embodiment, computing device 112 may generate updated lag frame 128 without assigning it to the respective flight phase. Instead, computing device 112 may store any lag frame into a lag time database 156. In another non-limiting embodiment, computing device 112 may generate update lag frame 128 as a function of a timer module 132. A "timer module," for the purpose of this disclosure, is a clock configured to measure specific time intervals. In a non-limiting embodiment, timer module 132 be used to count the duration of a flight phase and generate new time intervals for the lag in lag frame 128.

Still referring to FIG. 1, a "lag time database," for the purpose of this disclosure, is a data storage system configured to store or record any datum and/or lag frame as described herein. In some embodiments, lag time database 136 may include a lookup table in which a user may find potential lag frames to be assigned to a specific flight phase based on flight datum 108 and/or the circumstances of the electric aircraft and its flight. A "lookup table," as used in this disclosure, is an array used to retrieve data as a function of increasing runtime of input latency 116. In a non-limiting embodiment, the lookup table may be used to quickly retrieve and assign some lag frame from lag time database 136 in the event the bandwidth is being used to its limits. In a non-limiting embodiment, lag time database 136 may store a plurality of lag frames in a table. In another embodiment, computing device 112 of the electric aircraft may generate updated lag frame 128 better suited for a specific flight phase but not use it. This is so, at least in part, because every flight phase may be different, but it is beneficial to keep a robust database that may include a plurality of lag frames in which computing device 112 may choose the best one for the specific flight phase, wherein the specific flight phase may include a steeper climb phase, a shorter climb phase, a longer climb phase, etc. In a non-limiting embodiment, lag frame 120 may include an output buffer. An "output buffer," as used in this disclosure, is a data storage used to store and/or queue data. In a non-limiting embodiment, the output buffer may queue communication messages and/or any piece of data being transmitted. The pieces of data may include chunks of data. In some embodiments one or more output buffers may be used to store and/or queue different types of data and/or messages. For example and without limitation, one output buffer may be configured to store and/or queue communication messages while another output buffer may be configured to store and/or queue flight datum 108 and/or compiled flight datum 140, wherein either flight datum may be divided in to chunks of data. In some embodiments, the output buffers may be used in the event the data being transmitted exceeds the limit of the bandwidth, wherein the output buffers act as a safety measure. In another embodiment, the output buffer may be used to transmit any data in any orderly fashion. Persons skilled in the art, upon reviewing the entirety of this disclosure, will be aware of using a database for robust data collection in the context of assigning lag frames and queuing/storing data for purposes as described herein.

With continued reference to FIG. 1, lag frame 120 may be generated as a function of a machine-learning model. In a non-limiting embodiment, computing device 112 may generate a machine-learning model, wherein computing device 112 is configured to train the machine-learning model as a function of a lag training set using flight datum 108 as an input to output lag frame 120. A "lag training set," for the purpose of this disclosure, is an element of flight datum correlated to a time delay of the lag frame. In a non-limiting embodiment, the lag training set may include an element of data describing a flight phase and correlate it to a lag frame associated with that flight phase, wherein the lag training set is used to train the machine-learning model and determine lag frame 120. In some embodiments, the lag training set may be generated as a function of input latency 116. For example and without limitation, if an input latency of displaying data onto user device 156 is detected as 30 seconds, the lag training set may be generated with a correlated lag frame that is at least that time amount to ensure the data transmission and the data displaying of is occurring at a consistent rate or frames. In a non-limiting embodiment, computing device 112 may retrieve the lag training set from lag time database 136. In another non-limiting embodiment, the lag training set may correlate previous flight datum to previous lag frame, wherein computing device 112 may train the machine-learning model with the lag training set and output a more accurate lag frame 120.

Still referring to FIG. 1, computing device 112 may be configured to automatically maneuver the electric aircraft as a function of low lag frame 120. In a non-limiting embodiment, as low lag frame 120 may indicate smooth operation of electrical systems of the electric aircraft, computing device may automatically maneuver the electric aircraft to complete a flight phase such as landing as the bandwidth may have plenty of room for data transfer that may support the automatic maneuvering of the electric aircraft.

Figure 2:
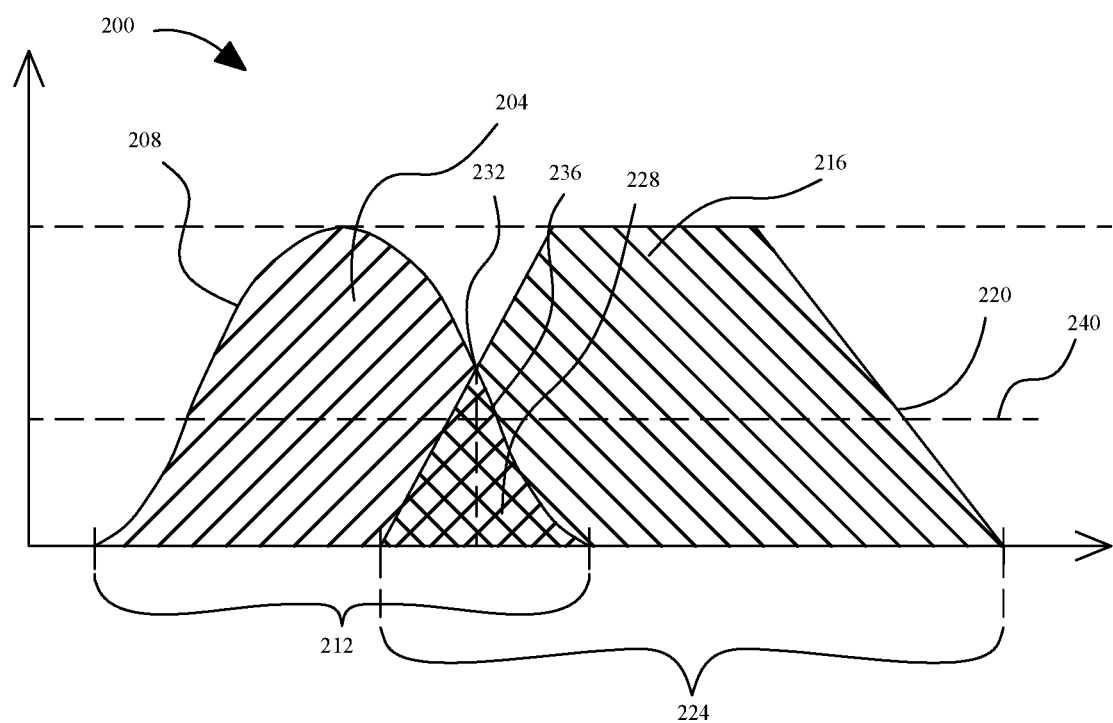
FIG. 2 is an illustration of an exemplary embodiments of fuzzy sets for a lag threshold.

Now referring to FIG. 2, an illustration of exemplary embodiments of fuzzy sets for a lag threshold is provided. A first fuzzy set 204 may be represented, without limitation, according to a first membership function 208 representing a probability that an input falling on a first range of values 212 is a member of the first fuzzy set 204, where the first membership function 208 has values on a range of probabilities such as without limitation the interval [0,1], and an area beneath the first membership function 208 may represent a set of values within first fuzzy set 204. Although first range of values 212 is illustrated for clarity in this exemplary depiction as a range on a single number line or axis, first range of values 212 may be defined on two or more dimensions, representing, for instance, a Cartesian product between a plurality of ranges, curves, axes, spaces, dimensions, or the like. First membership function 208 may include any suitable function mapping first range 212 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 204 may represent any value or combination of values as described above, including predictive prevalence value, probabilistic outcome, any resource datum, any niche datum, and/or any combination of the above. A second fuzzy set 216, which may represent any value which may be represented by first fuzzy set 204, may be defined by a second membership function 220 on a second range 224; second range 224 may be identical and/or overlap with first range 212 and/or may be combined with first range via Cartesian product or the like to generate a mapping permitting evaluation overlap of first fuzzy set 204 and second fuzzy set 216. Where first fuzzy set 204 and second fuzzy set 216 have a region 328 that overlaps, first membership function 208 and second membership function 220 may intersect at a point 232 representing a probability, as defined on probability interval, of a match between first fuzzy set 204 and second fuzzy set 216. Alternatively or additionally, a single value of first and/or second fuzzy set may be located at a locus 236 on first range 212 and/or second range 224, where a probability of membership may be taken by evaluation of first membership function 208 and/or second membership function 220 at that range point. A probability at 228 and/or 232 may be compared to a threshold 240 to determine whether a positive match is indicated. Threshold 240 may, in a non-limiting example, represent a degree of match between first fuzzy set 204 and second fuzzy set 216, and/or single values therein with each other or with either set, which is sufficient for purposes of the matching process; for instance, the lag threshold may indicate a sufficient degree of overlap between a maximum rate of data transfer and a minimum rate of data transfer, wherein the maximum rate of data transfer indicates pushing the limits of a given bandwidth and wherein the minimum rate of data transfer indicates a lower limit of available bandwidth space before it is considered to be too wasteful for not using the remaining bandwidth.

Figure 3:
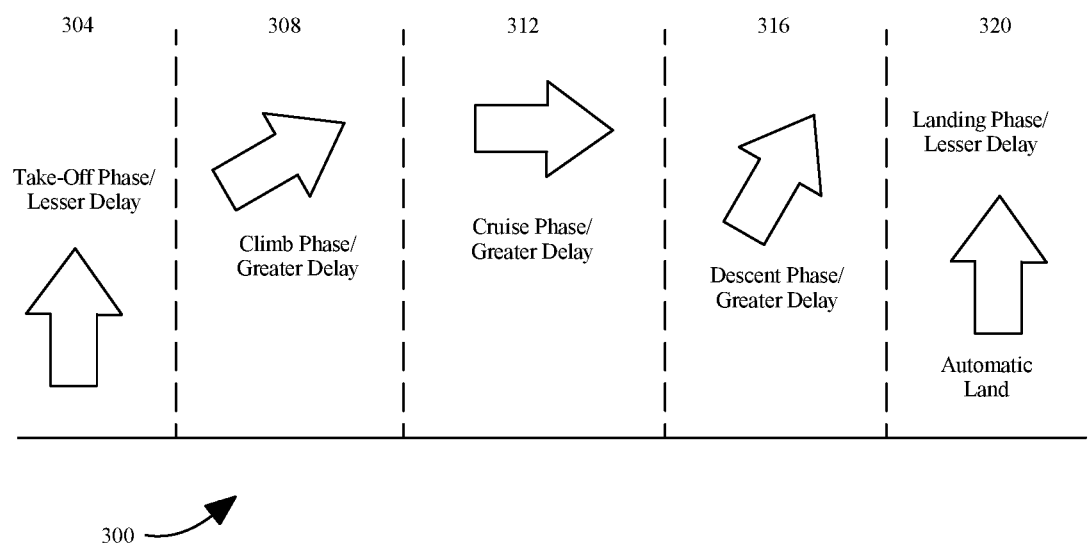
FIG. 3 is an illustration of an exemplary embodiment of a plurality of flight phases of an electric aircraft.

Referring now to FIG. 3, an illustration of exemplary embodiment of a plurality of flight phases 300 of an electric aircraft is illustrated. The plurality of flight phases are illustrated with arrows wherein the direction the arrow is pointing depicts the positioning of vertical propulsors of the electric aircraft as described in the entirety of this disclosure. Take-off phase 304 is illustrated wherein the phase includes lifting off from the ground and hovering. In a non-limiting embodiment phase 304 may be associated with a smaller lag frame that includes a lesser delay such as a delay of transmission of 300 milliseconds. In a non-limiting embodiment, the phase of lifting off and hovering over the ground may require less data transfer of secondary data wherein the transfer of the flight datum may be prioritized and be transmitted a higher speeds with lesser delay. In this phase, the flight datum may not include much information as it is the beginning of the flight, therefore, as the flight is being completed, the flight datum may become more robust in which the electric aircraft may continuously transmit the flight datum as data is continuously being measured and generated in various time intervals based on the time delay of the lag frames.

Still referring to FIG. 3, the electric aircraft may transition to climb phase 308 from take-off phase 304. In climb phase 308, the operating power of electric systems, actuators, flight components, etc. of the electric aircraft may be increased significantly to produce greater lift, acceleration, and forward movement. Climb phase 308 may further require more consistent data transfer of secondary data in the form of communication and/or radio frequencies between the electric aircraft and another party (e.g. air traffic control, other electric aircrafts, or a user device). This may result in a lesser rate of data transfer available for the flight datum as it is continuously being generated in which the lag frame associated with climb phase 308 may include a 1 second time delay for data transfer.

Still referring to FIG. 3, the electric aircraft may transition from climb phase 308 to cruise phase 312, in which cruise phase 312 may result in greater time delay for data transfer. In a non-limiting embodiment, cruise phase 312 may result in constant communication between the pilot of the electric aircraft and any second party for navigation purposes in which the bandwidth of the communication lines may only allow for slower rates for the flight datum. The lag frame in cruise phase 312 may include 30 second time delays and/or time intervals.

Still referring to FIG. 3, the electric aircraft may transition from cruise phase 312 to descent phase 316. In a non-limiting embodiment, descent phase 316 may be associated with a greater delay, similar to climb phase 308.

Still referring to FIG. 3, the electric aircraft may transition to the final stage such as landing phase 320. Similar to take-off phase 304, landing phase 304 may result in greater bandwidth space in which the lag frame may include a delay of 300 milliseconds. In a non-limiting embodiment, the computing device of the electric aircraft may recognize the current flight phase the electric aircraft is in and assign a lag frame based on the current flight phase.

Figure 4:
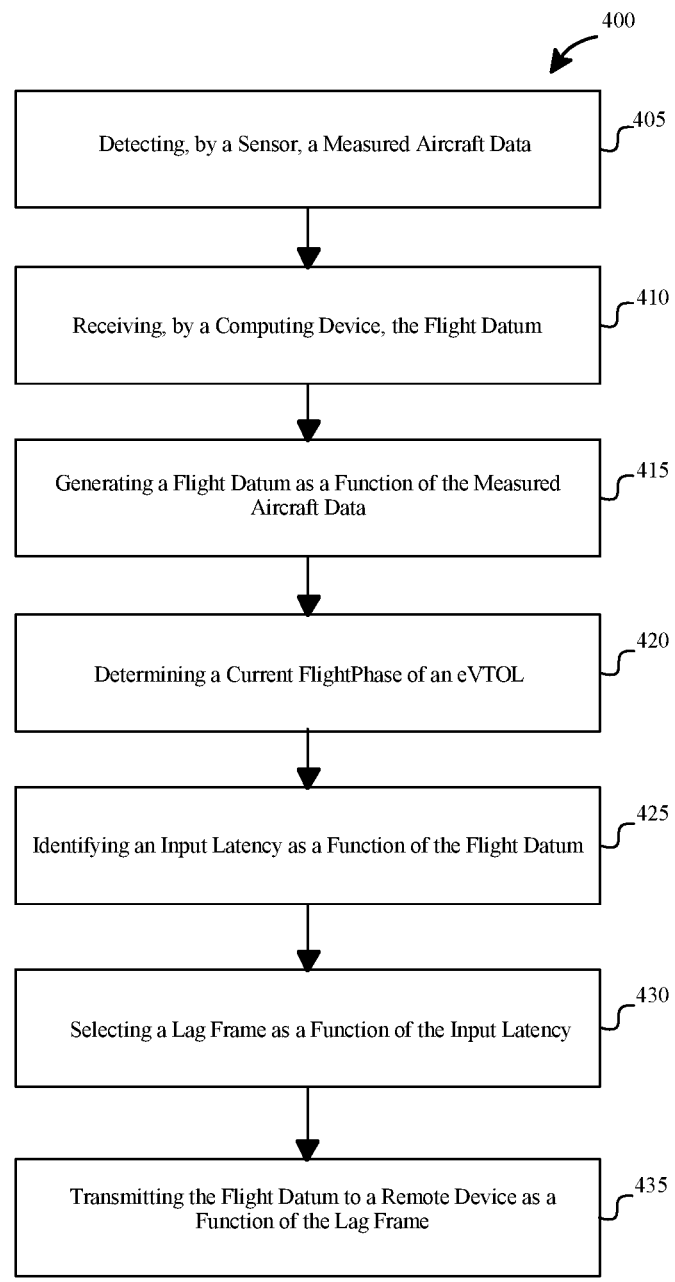
FIG. 4 is a flow diagram of an exemplary embodiment of a method for scalable lag based on flight phase of an electric aircraft.

Referring now to FIG. 4, a flow diagram of an exemplary embodiment of a method 400 for scalable lag based on flight phase of an electric aircraft is provided. Method 400, at step 405, may include detecting, by a sensor communicatively connected to an electric aircraft such as an eVTOL, a measured aircraft data. The sensor may include any sensor as described herein. The electric aircraft may include any electric aircraft as described herein. the measured aircraft data may include any measured aircraft data as described herein. In a non-limiting embodiment, method 400, at step 405, may include detecting a measured state datum. The measured state datum may include any measured state datum as described herein.

Still referring to FIG. 4, method 400, at step 410, may include receiving, by a computing device in the eVTOL and communicatively connected to the sensor, the flight datum. The computing device may be consistent with any computing device as described herein. In a non-limiting embodiment, the method may include receiving the flight datum as a function of plurality of physical CAN bus units. The physical CAN bus unit may be consistent with any physical CAN bus unit as described herein.

With continued reference to FIG. 4, method 400, at step 415, may include generating a flight datum as a function of the measured aircraft data and the flight phase. The flight datum may include a flight datum as described herein. In a non-limiting embodiment, generating the flight datum may include the use of any computation.

With continued reference to FIG. 4, method 400, at step 420, may include determining a current flight phase of the eVTOL. The flight phase may include any current flight phase and/or flight phase as described herein. In a non-limiting embodiment, identifying the flight phase may include measuring the functions and outputs of the flight components and/or the actuators of the eVTOL to determine the flight phase.

With continued reference to FIG. 4, method 400 may include connecting to a network. The network may include any network as described herein. In a non-limiting embodiment, method 400 may include establishing a connection between the electric aircraft and a user device. The user device may include any user device as described herein. In a non-limiting embodiment, the user device may include a computing device.

Still referring to FIG. 4, method 400 may include operating a flight simulator and generating a virtual representation of the eVTOL. The flight simulator may be consistent with any flight simulator as described herein. The virtual representation may be consistent with any virtual representation as described herein. In a non-limiting embodiment, the method may include generating a performance model depicting the eVTOL. The performance model may be consistent with any performance model as described herein.

Still referring to FIG. 4, method 400, at step 425, may include identifying an input latency as a function of the flight datum. The input latency may be consistent with any input latency as described herein. In a non-limiting embodiment, identifying the input latency may include measuring lag of the user device. In another non-limiting embodiment identifying the input latency may include measuring the lag of the frame rate of a monitor on the user device. The monitor of the user device is configured to display the flight datum for analyzing purposes.

Still referring to FIG. 4, method 400, at step 430, may include selecting a lag frame as a function of the input latency, wherein the lag frame further comprises a lag threshold. The lag frame may be consistent with any lag frame as described herein. The lag threshold may be consistent with any lag threshold as described herein. In a non-limiting embodiment, method 400 may include selecting the lag frame from a lag time database. The lag time database may be consistent with any lag time database as described herein. In a non-limiting embodiment, method 400 may include generating a machine-learning model, training the machine-learning model using a lag training set and the flight datum as inputs, and outputting the lag frame as a function of the lag training set and the flight datum. The lag training set may include any training set as described herein.

With continued reference to FIG. 4, method 400, at step 435, may include transmitting the flight datum to a remote device as a function of the lag frame. In a non-limiting embodiment, transmitting the flight datum in chunks. In a non-limiting embodiment, method 400 may include generating a compiled flight datum as a function of the chunks of flight datum. The compiled flight datum may include any compiled flight datum as described herein.

In a non-limiting embodiment, method 400 may include receiving, by the user device, the flight datum. In a non-limiting embodiment, receiving the flight datum may include receiving chunks of flight datum in parts based on the time intervals of the lag frame.

Figure 5:
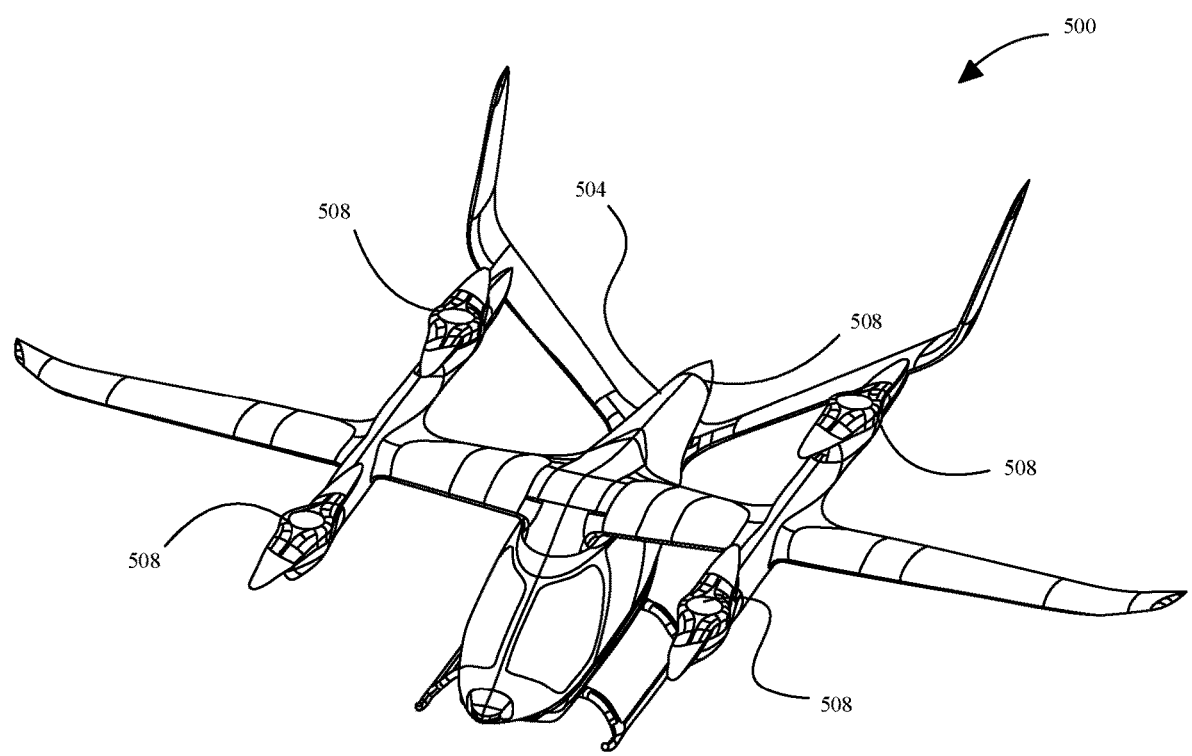
FIG. 5 is a schematic representation of an exemplary electric aircraft.

Referring now to FIG. 5, an exemplary embodiment of an aircraft 500 is illustrated. In an embodiment, aircraft 500 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 500 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, and titled "AN INTEGRATED ELECTRIC PROPULSION ASSEMBLY," the entirety of which is incorporated herein by reference.

With continued reference to FIG. 5, as used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 500, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 5, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 504 may include structural elements that physically support a shape and structure of an aircraft. Structural elements may take a plurality of forms, alone or in combination with other types. Structural elements may vary depending on a construction type of aircraft such as without limitation a fuselage 504. Fuselage 504 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 5, aircraft fuselage 504 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 504 orthogonal to a longitudinal (nose to tail) axis of the aircraft and may form a general shape of fuselage 504. A former may include differing cross-sectional shapes at differing locations along fuselage 504, as the former is the structural element that informs the overall shape of a fuselage 504 curvature. In embodiments, aircraft skin may be anchored to formers and strings such that the outer mold line of a volume encapsulated by formers and stringers includes the same shape as aircraft 500 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

Still referring to FIG. 5, aircraft 500 may include a plurality of flight components 508. As used in this disclosure a "flight component" is a component that promotes flight and guidance of an aircraft. In an embodiment, flight component 508 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 5, plurality of flight components 508 may include at least a lift propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis.

In an embodiment, and still referring to FIG. 5, plurality of flight components 508 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 5, plurality of flight components 508 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1045 N to force aircraft to in a horizontal direction along the longitudinal axis. As a further non-limiting example, pusher component may twist and/or rotate to pull air behind it and, at the same time, push aircraft 500 forward with an equal amount of force. In an embodiment, and without limitation, the more air forced behind aircraft, the greater the thrust force with which aircraft 500 is pushed horizontally will be. In another embodiment, and without limitation, forward thrust may force aircraft 500 through the medium of relative air. Additionally or alternatively, plurality of flight components 508 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 6:
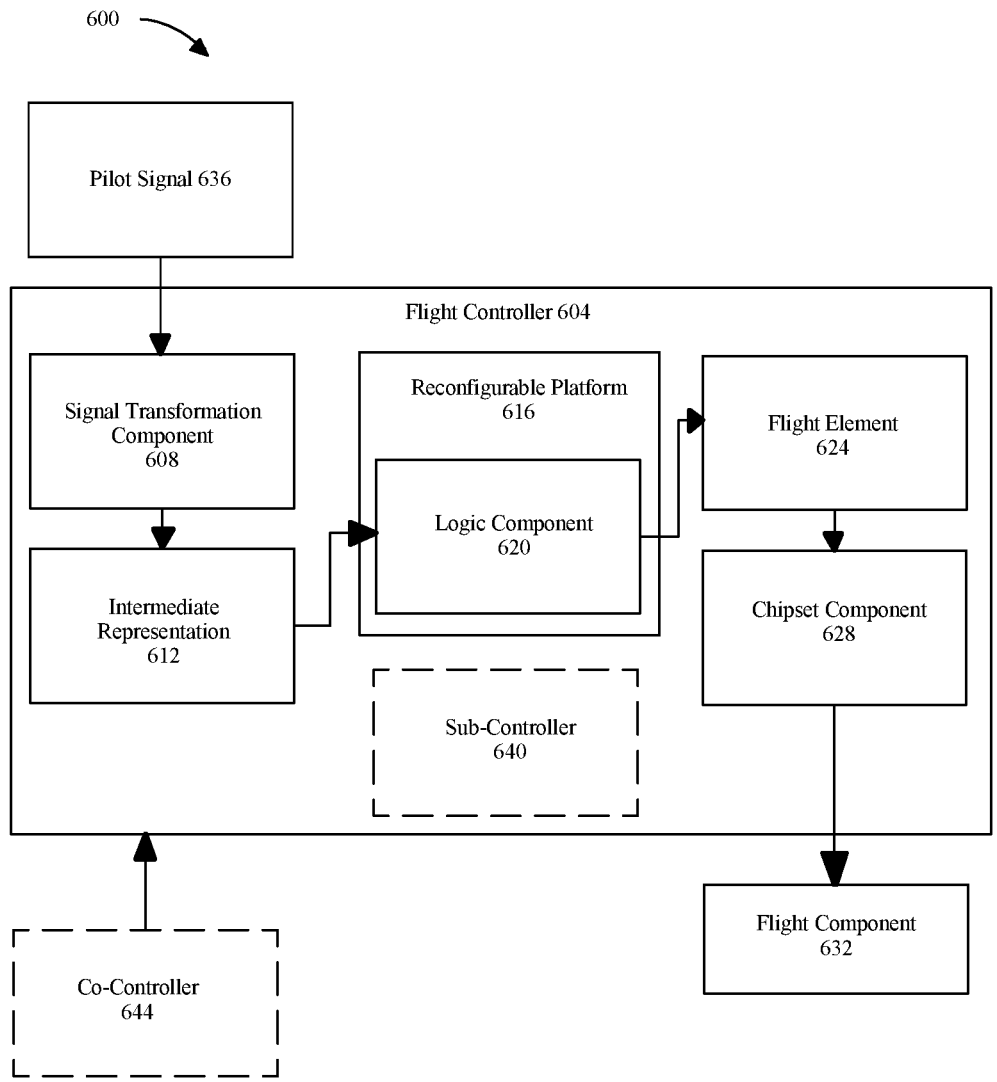
FIG. 6 is a block diagram illustrating an exemplary flight controller.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 6-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function σ, which may generate one or more outputs γ. Weight $w_i$ applied to an input $x_i$ may indicate whether the input is "excitatory," indicating that it has strong influence on the one or more outputs γ, for instance by the corresponding weight having a large numerical value, and/or a "inhibitory," indicating it has a weak effect influence on the one more inputs γ, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above. In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
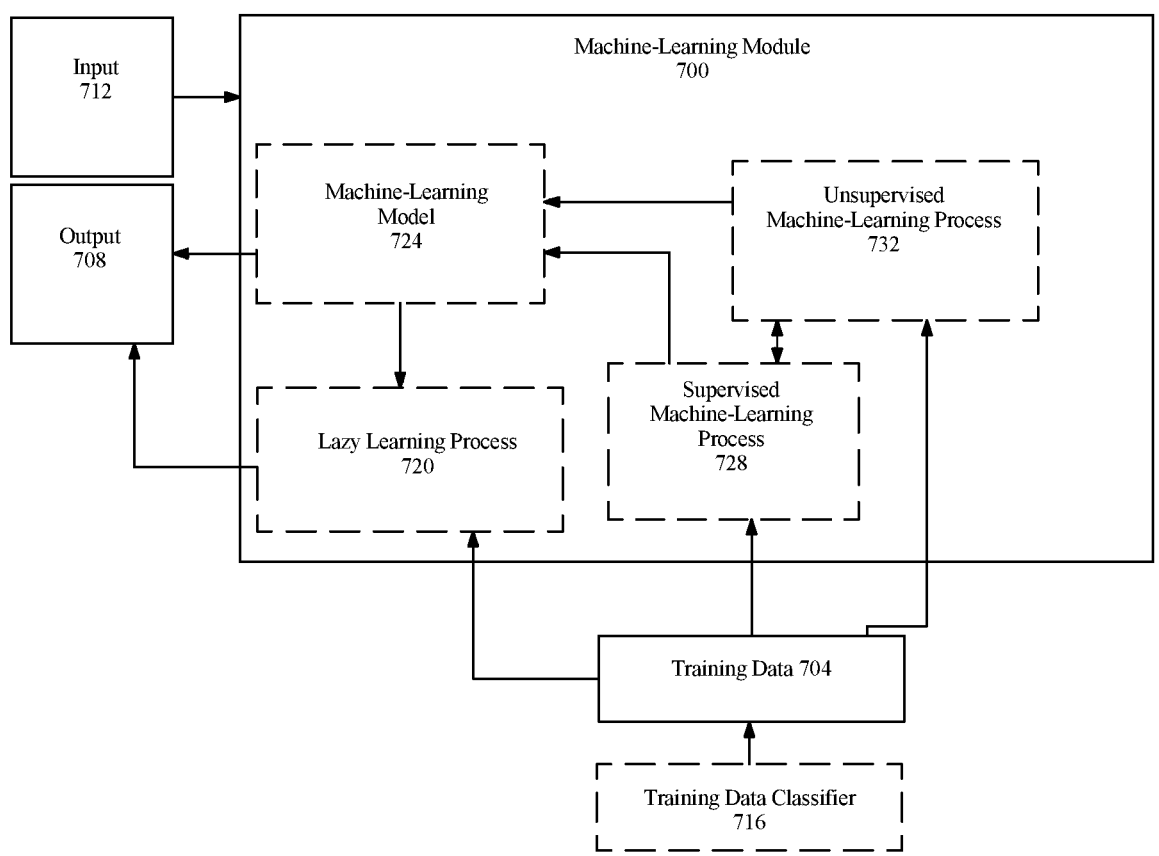
FIG. 7 illustrates a block diagram of an exemplary machine-learning process.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example the flight datum may be an input and the lag frame may be an output.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to a variety of flight phases of the electric for which a subset of training data describing a lag frame corresponding to a flight phase may be selected.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include the flight datum as described above as inputs, the lag frame described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
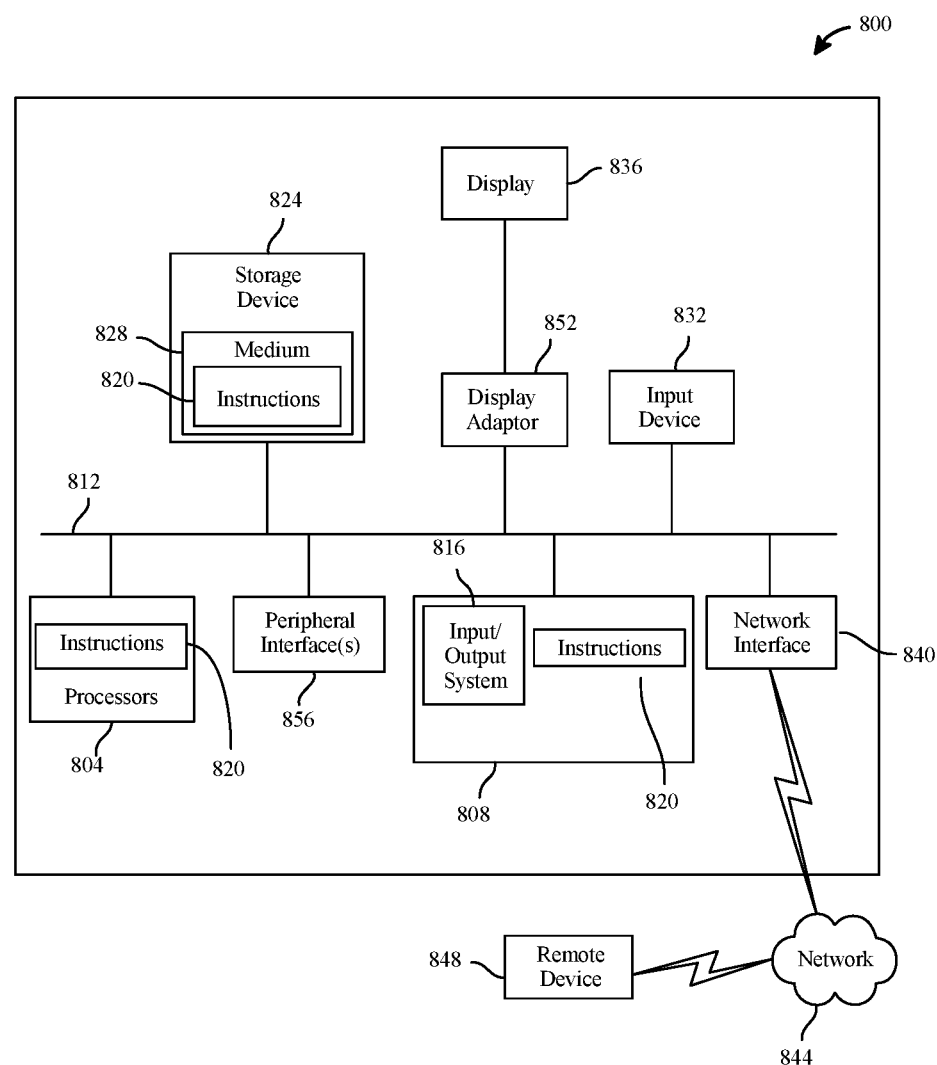
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for scaling lag based on flight phase of an electric aircraft, the system comprising:
   a sensor communicatively connected to an electric vertical takeoff and landing (eVTOL) aircraft, wherein the sensor is configured to:
      detect measured aircraft data; and
      generate a flight datum as a function of the measured aircraft data;
   a computing device in the eVTOL aircraft and communicatively connected to the sensor,
      wherein the computing device is configured to:
      receive the flight datum;

determine a current flight phase as a function of the flight datum, wherein the current flight phase includes a climb phase of the eVTOL aircraft which follows a lift-off phase of the eVTOL aircraft;

identify an input latency as a function of the current flight phase;

select a lag frame as a function of the input latency, wherein the lag frame further comprises a lag threshold, wherein the lag frame associated with the climb phase is greater than that associated with the lift-off phase, wherein the lag frame is set to a time value of the lag threshold if the selected lag frame reaches the time value of the lag threshold; and transmit the flight datum to a remote device as a function of the lag frame.

2. The system of claim 1, wherein the eVTOL aircraft is connected to a network, wherein the network is configured to:

establish a connection between the computing device of the eVTOL aircraft and the remote device;

receive the flight datum from the computing device; and transmit the flight datum to the remote device as a function of the lag frame.

3. The system of claim 2, wherein the network further comprises a mesh network.

4. The system of claim 1, wherein the lag frame is selected from a lookup table.

5. The system of claim 1, wherein the computing device is configured to generate an updated lag frame as a function of the input latency exceeding the lag threshold of the lag frame.

6. The system of claim 5, wherein the computing device is further configured to:

initiate a timer module as a function of the input latency exceeding the lag threshold of the lag frame; and update the lag frame as a function of the timer module.

7. The system of claim 1, wherein the eVTOL aircraft is further configured to perform flight maneuvers automatically as a function of a low lag frame.

8. The system of claim 1, wherein the computing device is further configured to:

compile a plurality of flight datum received from the sensor during a flight phase; and generate a compiled flight datum as a function of the plurality of the flight datum.

9. The system of claim 8, wherein the computing device is further configured to generate a performance model as a function of the compiled flight datum.

10. The system of claim 9, wherein the performance model is generated as a function of a flight simulator operating on the computing device.

11. A method for scaling lag based on flight phase of an electric aircraft, the method comprising:

detecting, by a sensor communicatively connected to an electric vertical takeoff and landing (eVTOL) aircraft, a measured aircraft data;

generating, by the sensor, a flight datum as a function of the measured aircraft data;

receiving, by a computing device communicatively connected to the sensor, the flight datum;

determining, by the computing device, a current flight phase as a function of the flight datum, wherein the current flight phase includes a climb phase of the eVTOL aircraft which follows a lift-off phase of the eVTOL aircraft;

identifying, by the computing device, an input latency as a function of the current flight phase;

selecting, by the computing device, a lag frame as a function of the input latency, wherein the lag frame further comprises a lag threshold, wherein the lag frame associated with the climb phase is greater than that associated with the lift-off phase, wherein the lag frame is set to a time value of the lag threshold if the selected lag frame reaches the time value of the lag threshold; and transmitting, by the computing device, the flight datum to a remote device as a function of the lag frame.

12. The method of claim 11, wherein the method further comprises:

establishing, by a network, a connection between the computing device of the eVTOL aircraft and the remote device;

receiving, by the network, the flight datum from the computing device;

recording the fight datum into a lag time database; and transmitting, by the network, the flight datum to the remote device as a function of the lag frame.

13. The method of claim 12, wherein the network further comprises a mesh network.

14. The method of claim 11, wherein the lag frame is selected from a lookup table.

15. The method of claim 11, wherein the method further comprises generating an updated lag frame as a function of the input latency exceeding the lag threshold of the lag frame.

16. The method of claim 15, wherein the method further comprises:

initiating, by the computing device, a timer module as a function of the input latency exceeding the lag threshold of the lag frame; and updating the lag frame as a function of the timer module.

17. The method of claim 11, wherein the method further comprises the eVTOL aircraft automatically performing flight maneuvers as a function of a low lag frame.

18. The method of claim 11, wherein the method further comprises:

compiling, by the computing device, a plurality of flight datum received from the sensor during a flight phase; and generating a compiled flight datum as a function of the plurality of the flight datum.

19. The method of claim 18, wherein the generating the compiled flight datum further comprises generating a performance model as a function of the compiled flight datum.

20. The method of claim 19, wherein generating the performance model further comprises operating a flight simulator on the computing device.

* * * * *